April 9, 1935. A. W. SCHARPF 1,997,268
VULCANIZER
Filed Dec. 11, 1933
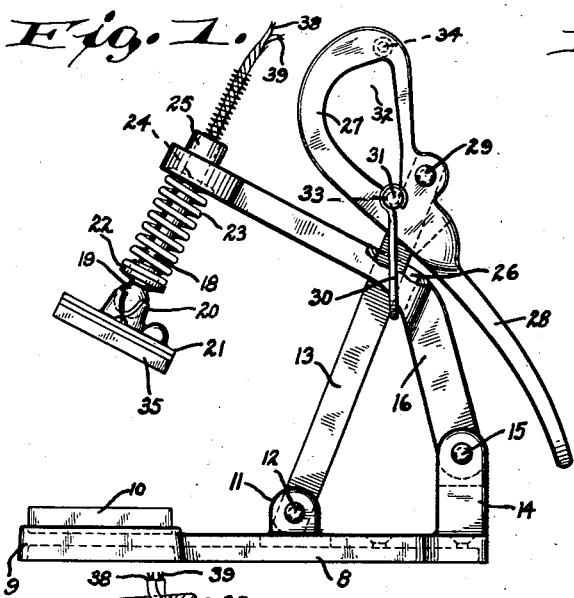
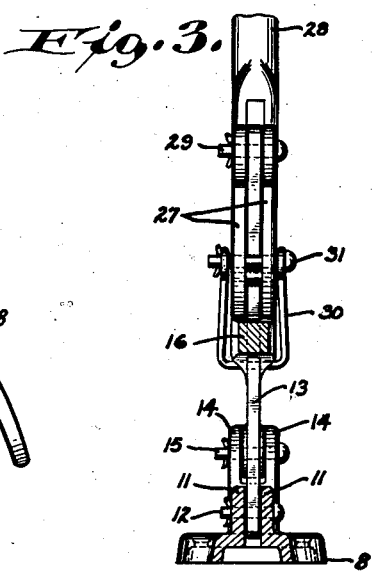
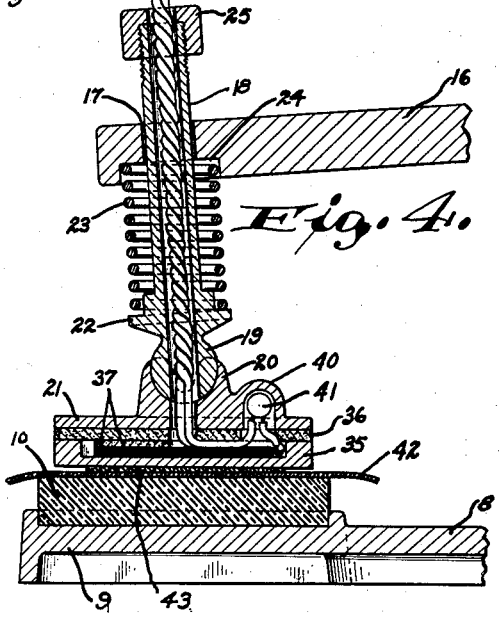
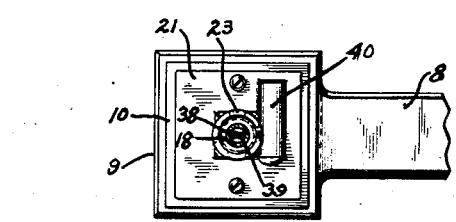
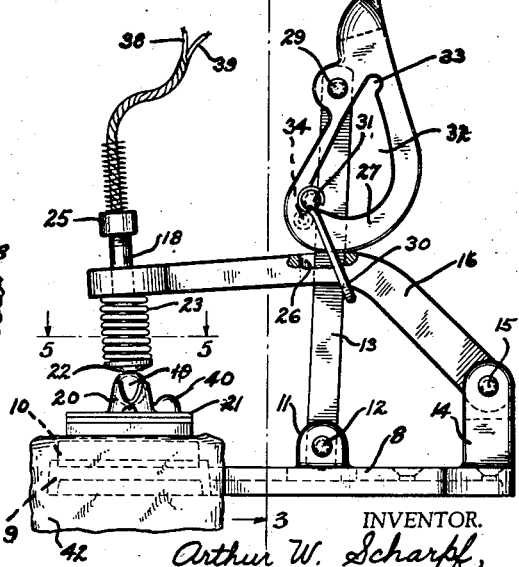
INVENTOR.
Arthur W. Scharpf,
BY
Morsell, Liebe & Morsell
ATTORNEYS.

Patented Apr. 9, 1935

1,997,268

UNITED STATES PATENT OFFICE 1,997,268

VULCANIZER

Arthur W. Scharpf, La Crosse, Wis., assignor of one-third to Bernard R. Hammes and one-third to William R. Finn, La Crosse, Wis.

Application December 11, 1933, Serial No. 701,805

8 Claims. (Cl. 18—18)

This invention relates to improvements in vulcanizers, and more particularly to an electrically heated vulcanizer for repairing pneumatic tire inner tubes and other classes of rubber goods.

A general object of the present invention is to provide an improved electrically operated vulcanizer which is very rapid in its operation but economical in current consumption, is easily manipulated, and is, moreover, highly efficient in use.

A further object of the invention is to provide a vulcanizer in which the vulcanizing head is manipulated to and from vulcanizing position by means of a lever, there being an eccentric engagement between said lever and the head carrying arm whereby the head and arm may be tightly clamped in lowered vulcanizing position by a simple movement of the lever.

A further object of the invention is to provide a vulcanizer in which the head, when secured in vulcanizing position will apply an unusual amount of pressure to the material engaged by the head.

A further specific object of the invention is to provide a vulcanizer in which a movement of the lever will raise the vulcanizing head to an inoperative position, there being means for automatically, releasably locking the lever in this position.

A further object of the invention is to provide a vulcanizer wherein there is a ball and socket joint between the vulcanizing head and the arm carrying the same, this arrangement tending to apply the pressure in such a manner that the flow of gum over uneven spots on the material being repaired, will be equalized.

A further object of the invention is to provide a vulcanizer wherein, when the head is clamped in operative vulcanizing position, a compressed spring reacts against the vulcanizing head, to apply pressure so that the flow of raw gum rubber will be forced into the spot being repaired.

A further object of the invention is to provide a vulcanizer which is of very simple construction, is inexpensive to manufacture and operate, is strong and durable, and is well adapted for the purposes set forth.

With the above and other objects in view the invention consists of the improved vulcanizer, and its parts and combinations as set forth in the claims, and all equivalents thereof.

In the accompanying drawing in which the same reference characters indicate the same parts in all of the views:

Fig. 1 is a side view of the improved vulcanizer with the vulcanizing head in raised position, part being broken away and in section;

Fig. 2 is a similar view only showing the head in lowered, work-engaging position;

Fig. 3 is a sectional view taken on line 3—3 of Fig. 2.

Fig. 4 is an enlarged, fragmentary detail sectional view of the block, head and arm portions of the vulcanizer; and Fig. 5 is a horizontal sectional view taken on line 5—5 of Fig. 2.

Referring now more particularly to the drawing it will appear that the improved vulcanizer includes a flat, relatively heavy, metallic base portion 8 formed at one end with an enlargement 9. Said enlargement is recessed inwardly from its top surface to receive an upwardly projecting vulcanizing block 10, formed of hard rubber, or a similar resilient material.

Projecting upwardly from an intermediate portion of the top surface of the base 8 are a pair of spaced lugs 11 between which is pivotally mounted, on a pivot pin 12, the lower end of an upwardly extending link 13. At the end of the base 8, opposite the enlargement 9, there are a pair of spaced, longer, upstanding lugs 14 between which, on a pivot pin 15, the lower end portion of a curved, head carrying arm 16 is pivotally mounted. The outer end portion of the arm 16 has a bore 17 therethrough and an elongated tubular post 18 is slidably extended through said bore. The lower end of said post is formed as a ball 19 which seats in a socket 20 in a boss portion on the upper face of a vulcanizing head 21, by which means said head is universally movably carried by the lower end of the post. Above the ball portion 19 said post is formed with a shoulder 22 which engages the lower end portion of a spring 23 coiled about a portion of the post. In the under side of the outer end portion of the arm 16 there is a recess 24, of greater diameter than the bore 17, and the upper end portion of the spring 23 extends into said recess to resiliently engage the outer end portion of the arm 16. A nut 25 is threaded onto the upper threaded end portion of the post 18 to limit movement of the post in one direction due to the expansive force of the spring 23.

An intermediate portion of the link 13 extends slidably through a slot 26 in an intermediate portion of the arm 16 and the upper end portion of said link extends between the bifurcated eccentric portion 27 of an operating lever 28, and is pivotally secured to an upper portion of the lever, intermediate the ends of the same, as at 29. As mentioned, the portion 27 of the lever is eccentric, and said eccentric portion, upon a raising of the manipulating end of the lever, is adapted to ride on the top surface of the arm 16.

A relationship is maintained between the eccentric 27, the arm 16, and the link 13, in all positions, by means of a metallic loop 30. Said loop has an upper cross pin 31 extending through an opening 32 in the eccentric, and said loop is depended thereby, freely engaging under the arm 16 juxtaposed its point of engagement with the link 13. During movements of the lever 28 the cross-pin 31 of the loop member rides on the inner surfaces of the eccentric defining the opening 32 and in the position of the lever shown in Fig. 1, which effects a lifting of the arm 16 and vulcanizing head, the cross-pin 31 lodges in a recess 33 and thereby releasably secures said parts in lifted position. When the lever 28 is moved to its other extreme position, as in Fig. 2, the cross-pin rides in the opening 32 to the other end thereof and the loop depends as shown. Movement of the eccentric to effect a lowered, locked position of the arm 16 and vulcanizing head 21 is limited by a pin 34 between the outer extremities of the bifurcated portions of the eccentric 27, said pin engaging an edge of the link 13.

The vulcanizing head 21 is formed with a top metallic plate, a lower, recessed metallic plate 35, and an interposed layer of insulating material 36. Within the recess of the plate 35 there are layers of resistance elements 37 separated by sheets of mica or the like. Electric current is obtained from any convenient source (not shown) by circuit wires 38 and 39 which extend downwardly through the post 18 and connect at their ends to different portions of the resistance elements 37. Mounted in a hollow boss portion 40 in the head 21, and intersecting one of the circuit wires, is a thermostatic member 41 which controls the temperature of the resistance elements, within certain predetermined limits.

To operate the improved vulcanizer it is first necessary to attach the circuit wires 38 and 39 to an electrical outlet and then current will flow to the resistance elements in the vulcanizing head. Prior to the head being heated to the proper vulcanizing heat, which takes about ten minutes, the head should be maintained in lifted position. This is accomplished by moving the lever 28 in a clockwise direction with respect to Fig. 2 until the position illustrated in Fig. 1 is attained wherein the cross-pin 31 lodges in the recess 33 and releasably holds the parts in the illustrated position. The article to be vulcanized, as for instance an inner tube 42, is preferably prepared and is placed over the vulcanizing block 10. The repair patch 43 is placed on the block over the damaged portion of the tube. After the vulcanizing head has been sufficiently heated, it is necessary to lower it and this is accomplished by moving the lever 28 from the position shown in Fig. 1, in a counter-clockwise direction, to the position shown in Fig. 2. During this movement the eccentric 27 will ride on the top surface of the arm 16 and force it, and the post 18 carried thereby, downwardly. In the lowered position of the arm 16, the head 21 clampingly engages the work on the block and a tight clamping engagement is effected by virtue of the compression of the spring 23. The arm 16 is releasably locked in lowered position by the shape of the eccentric 27 which engages it, and by the fact that the lever is thrown beyond dead center with respect to its pivotal mounting 29. In a relatively short period of time the tube or other article will be efficiently vulcanized and by moving the lever in the reverse direction the head will be raised to release the work.

From the foregoing description it will be seen that the improved vulcanizer is of simple and novel construction, and is well adapted for the purposes set forth.

What is claimed as the invention is:

1. In a vulcanizer, a base member having a vulcanizing block at one end thereof, an arm pivotally connected at one end to said base, a vulcanizing head, a resilient connection between the outer end of said arm and the head, a pivotally mounted lever directly contactable with said arm to lower it and the head toward the block, and a lifting connection between the lever and the arm.

2. In a vulcanizer, a base member having a vulcanizing block at one end thereof, an arm pivotally connected at one end to said base, a vulcanizing head, a resilient and universal connection between the outer end of said arm and the head, a pivotally mounted lever directly contactable with said arm to lower it and the head toward the block, and a lifting connection between the lever and the arm and freely engaging the latter.

3. In a vulcanizer, a base member having a vulcanizing block at one end thereof, an arm pivotally connected at one end of the base, a vulcanizing head, a post universally connected with the head and slidably connected with the free end of said arm, resilient pressure applying means between the arm and the head, a pivotally mounted lever directly contactable with said arm to lower it and the head toward the block, and a lifting connection between the lever and the arm.

4. In a vulcanizer, a base member having a vulcanizing block at one end thereof, an arm pivotally connected at one end to said base, a vulcanizing head, a resilient connection between the outer end of said arm and the head, a pivotally mounted lever directly contactable with surface portions of said arm to lower it and the head toward the block, and a motion augmenting elevating connection between the lever and said arm.

5. In a vulcanizer, a base member having a vulcanizing block at one end thereof, an arm pivotally connected at one end to said base, a vulcanizing head, a resilient connection between the outer end of said arm and the head, a pivotally mounted lever directly contactable with said arm to lower it and the head toward the block, and a traveling, motion augmenting elevating connection between the lever and said arm.

6. In a vulcanizer, a base member having a vulcanizing block at one end thereof, an arm pivotally connected at one end to said base, a vulcanizing head, a resilient connection between the outer end of said arm and the head, a pivotally mounted lever, an eccentric formed at the inner end portion of said lever and contactable with said arm to lower it and the head toward the block, and a shiftable lifting connection between the lever and the arm.

7. In a vulcanizer, a base member having a vulcanizing block at one end thereof, an arm pivotally connected at one end to said base, a vulcanizing head, a resilient connection between the outer end of said arm and the head, a pivotally mounted lever contactable with said arm to lower it and the head toward the block, and a traveling, motion augmenting elevating connection between the lever and said arm, said connection being lodgable in a recess in said lever to releasably lock the lever and parts carried thereby in one position of adjustment.

8. A vulcanizer, comprising a base member having a vulcanizing block at one end thereof, an arm pivotally connected at one end of said base, a vulcanizing head having heating elements therein, a post universally connected with the head and slidably connected with the free end of said arm, resilient pressure applying means between the arm and the head, a link pivotally connected at one end to said base, a lever pivotally connected intermediate its ends to the other end of said link, the inner end portion of said lever being formed as an eccentric and being engageable with the top portion of said arm, there being an opening in said eccentric, and a looped member depended from the opening in said eccentric portion and shiftably engaging said arm to lift it upon movement of the lever in one direction.

ARTHUR W. SCHARPF.